Patented Sept. 19, 1922.

1,429,876

UNITED STATES PATENT OFFICE.

HUGO HEMELMANN, OF HANOVER, GERMANY.

COLLOIDAL SOLUTION AND METHOD OF PREPARING SAME.

No Drawing.   Application filed October 1, 1919. Serial No. 327,826.

(GRANTED UNDER THE PROVISIONS OF THE ACT OF MARCH 3, 1921, 41 STAT. L., 1313.)

*To all whom it may concern:*

Be it known that I, HUGO HEMELMANN, a citizen of the Republic of Germany, residing at Hanover, Germany, have invented certain new and useful Improvements in Colloidal Solutions and Methods of Preparing Same (for which I have filed applications in Germany, March 3, 1917; Austria, March 18, 1918; Switzerland, March 19, 1918; Hungary, March 26, 1918; Holland, April 5, 1918; Italy, April 13, 1918; England, April 22, 1918), of which the following is a specification.

My invention relates to colloidal solutions and to a method of preparing them, and its particular object is a colloidal solution of superior stability.

As is well known, solid bodies which have been sufficiently comminuted by mechanical means, can be converted into colloidal solutions by treating them with the solutions of certain substances. Thus for instance kaolin can be converted into a hydrosol by aid of small quantities of an alcali solution. It is further well known that the stability of sols can be materially increased by adding to them certain electrolytes or organic non-electrolytes such as albumen, gelatine, gum arabic, agar, isinglass and the like, such substances being called protective colloids.

I have now ascertained that watery solutions of cherry gum are capable to a very high degree to convert highly comminuted solid bodies into colloidal solutions and also to render sols stable.

The colloidal solutions thus obtained possess a very high degree of stability not only with regard to the settling velocity of their particles but also with regard to the capacity of resistance against flaking tendencies.

Of the substances adapted to be transformed into the colloidal state by the method according to my invention the following may be mentioned specifically: solid substances such as sulphur, selenium, tellurium, carbon in its different modifications (such as lamp black, graphite, blood charcoal, animal charcoal), silicen, titanium, nickel, molybdenum, chromium and the like; of chemical compounds barium sulphate, lead sulphate, white lead, iron oxides, chromium oxides, metal sulphides and others.

The substances in question are preferably subjected to the treatment in a state of extreme comminution or in the amorphous or finely grained (crystallised) state.

In some cases the method according to the present invention does not at first furnish completely colloidal solutions. In these cases the sols produced contain besides the ultra microscopic particles also coarser particles which can be discerned under the microscope and even with the naked eye. An incomplete transformation of this kind will take place for instance in the case where the substances before being treated with cherry gum have not been mechanically comminuted to the necessary extent. In such cases it suffices to let the sols containing coarser particles stand for some time so as to allow these particles to settle down. The supernatant liquid is then separated from the deposit by decantation. If the solution has been allowed to stand a sufficiently long time the liquid obtained after this fashion will contain only ultra microscopic particles. The separation from the coarser particles might of course be effected as well by centrifugation or by filtration.

This modification of my process can also be used for partly or completely separating the components of a mixture from each other. As different substances lend themselves more or less to colloidalisation, it is possible, by using suitable quantities of cherry gum and by predetermining the duration of mixing in a suitable way, to cause one of the substances to be transformed into the colloidal state, while another component of the original mixture has not yet undergone this transformation. In such a case the subsequent settling operation or centrifugation or filtration will then cause the components of the original mixture to be separated from each other by simply separating the colloidal from the non-colloidal particles.

*Example I.*—Iron oxide designed to be used as a paint is mixed with about 3 per cent of cherry gum previously dissolved in water and the mixture is then intimately stirred with the required quantity of water. If the operation of stirring is interrupted, after some time the coarser particles which may still be present in the mass will settle down and can then be separated from the supernatant suspension. This coarser residue may be found once more and may then be treated with cherry gum anew. The colloidal solution can be employed as a paint.

*Example II.*—The hydrosols of elementary platinum obtained by electric dispersion, for instance according to Bredig's method, are comparatively little stable. By mixing a sol of this kind containing 0.02 per cent platinum with so much of a cherry gum solution that the sol then contains between 0.05 and 0.5 per cent cherry gum, or by dissolving the corresponding quantity of cherry gum in the sol one obtains sols of a very superior stability. Of course the electric dispersion might as well be carried through from the beginning in a dilute solution of cherry gum.

Among the various gums containing arabose, cherry-gum has superior colloid-forming properties inasmuch as it contains minimum of free acid as compared with other allied gums, and is, therefore, less liable to deflocculation. Colloidal solutions prepared with such gum have been found to be much more stable than those prepared with gum arabic or with gum tragacanth in view of the different behavior of the dispersed solutions or emulsions obtained from these gums and their difference in reversibility. Thus, it is well known that cherry gum is preferred as a stiffening agent, in the manufacture of hats and the like owing to the fact that the desiccated mixture with water is free from brittleness, while desiccated tragacanth solution is extremely brittle. These facts may be due to the presence of a considerable percentage of an elastic cerasin salt, while other gums of this class are free from such elasticity-conferring ingredients.

I claim:

1. The herein described process, which consists in treating finely divided matter with cherry gum and a dispersing medium.

2. The herein described process, which consists in treating finely divided solid matter with cherry gum and a dispersing medium.

3. The herein described process, which consists in mechanically comminuting solid substances, and treating the same with cherry gum and a dispersing medium.

4. The herein described process, which consists in mechanically comminuting solid substances, and treating the same with an aqueous dispersing liquid containing cherry gum.

5. The herein described product which consists of finely divided matter suspended in a liquid containing cherry gum.

6. The herein described product which consists of finely divided matter suspended in an aqueous dispersing liquid containing cherry gum.

7. The process of producing colloidal solutions which consists in treating finely divided matter containing a dispersoid with a mixture of cherry gum.

8. The process of preparing colloidal solutions which consists in treating finely divided matter containing dispersoids with a mixture of cherry gum and a suitable dispersing medium, intimately mixing and agitating the ingredients, allowing the incompletely dispersed particles to become separated from the mixture, and eliminating said separated particles from the remaining liquor.

9. The process of preparing colloidal solutions which consists in treating finely divided matter containing dispersoids with a mixture of cherry gum and a suitable dispersing medium, allowing the coarser and incompletely dispersed particles to become separated from the mixture, finely comminuting said separated particles, and treating said comminuted separated particles with a mixture of cherry gum and a dispersing medium.

10. The process of preparing colloidal solutions which consists in intimately mixing and treating finely divided matter of different phases of dispersability with a dispersion of cherry gum in a suitable dispersing medium, and separating the liquid containing the colloidized particles from the non-coloidal particles.

In testimony whereof I affix my signature, in presence of two witnesses.

HUGO HEMELMANN.

Witnesses:
W. BASHMANN,
DR. HOMANN.